DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 17, 1973

909 O.G. 794

T909,014

MASKING OF DEFECTS IN ELECTROPHOTOGRAPHIC ELEMENTS

Joseph Y. Kaukeinen, % Eastman Kodak Company, Kodak Park Division, 1669 Lake Ave., Rochester, N.Y. 14650

Filed Nov. 29, 1971, Ser. No. 203,017

Int. Cl. B44d *1/14;* G03g *5/00*

U.S. Cl. 117—2 R

No Drawing. 20 Pages Specification

A finely-divided electroscopic material with a high electrical resistance is deposited over a low conductivity electrical defect in the surface of a photoconductor element. The deposit of electroscopic material increases the effective electrical resistance of the defect area and thus, for example, reduces unwanted background density of a xerographic print made from such a photoconductor element. Preferably, the finely-divided electroscopic material is electrophoretically applied to the surface of a photoconductive element by means of a liquid developer composition. According to the invention an electrostatic charge is formed, in the dark, on the photoconductive layer of an electrographic element; then, in the dark, a finely-divided electroscopic resinous material carrying a charge of the same sign as the charge formed on the photoconductive layer is applied to said layer, whereby the electroscopic material is attracted to areas of the photoconductive layer which exhibit greater electrical conductivity than the rest of the photoconductive layer.